D. HILL & J. A. MERONEY, Sr.
DRIER AND EVAPORATOR.
APPLICATION FILED OCT. 8, 1917.

1,296,519.

Patented Mar. 4, 1919.
5 SHEETS—SHEET 2.

Fig. 2.

INVENTORS
David Hill
BY John A. Meroney Sr.
Arthur L. S. Ce.
ATTORNEY

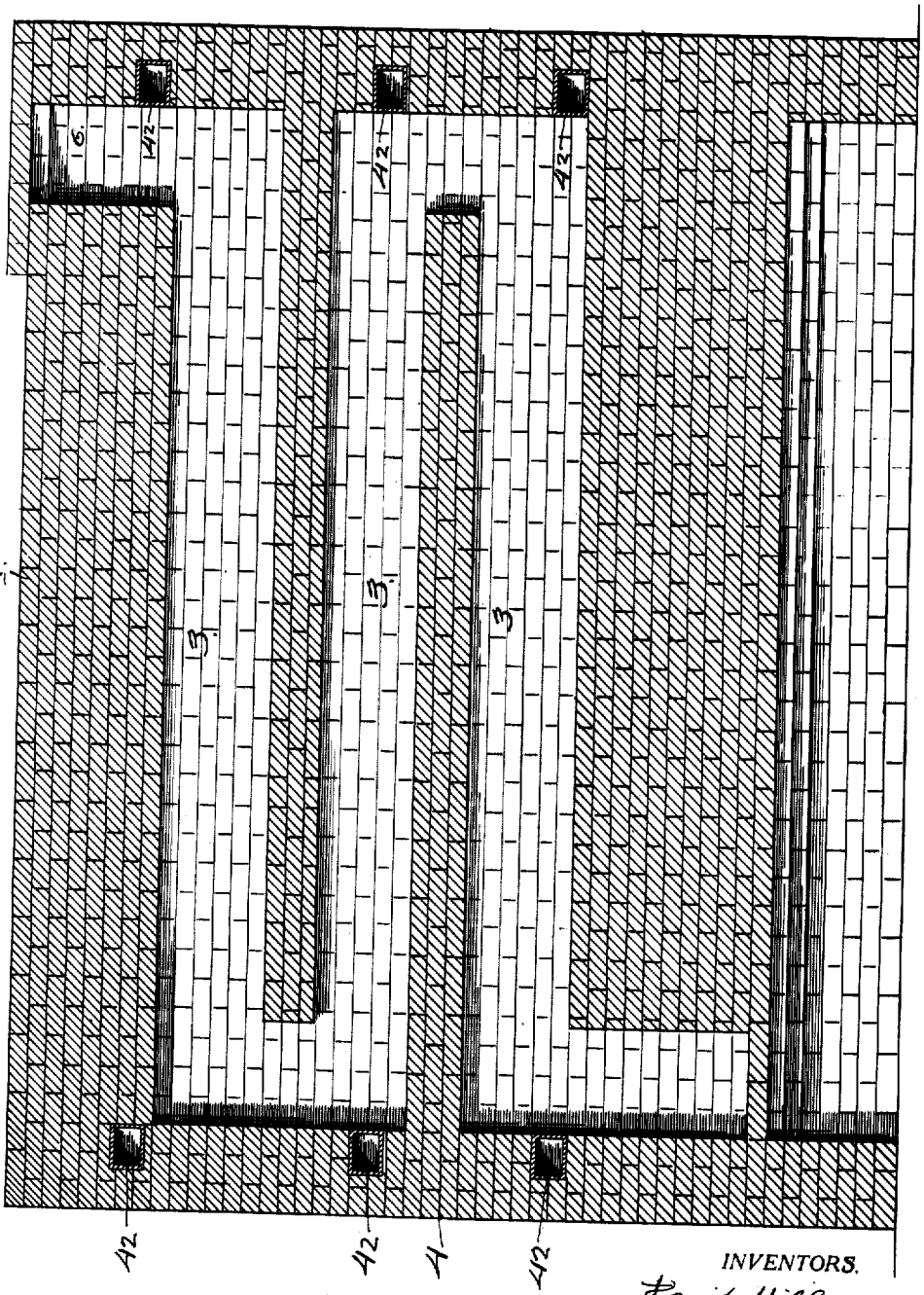

D. HILL & J. A. MERONEY, Sr.
DRIER AND EVAPORATOR.
APPLICATION FILED OCT. 8, 1917.
1,296,519.
Patented Mar. 4, 1919.
5 SHEETS—SHEET 4.
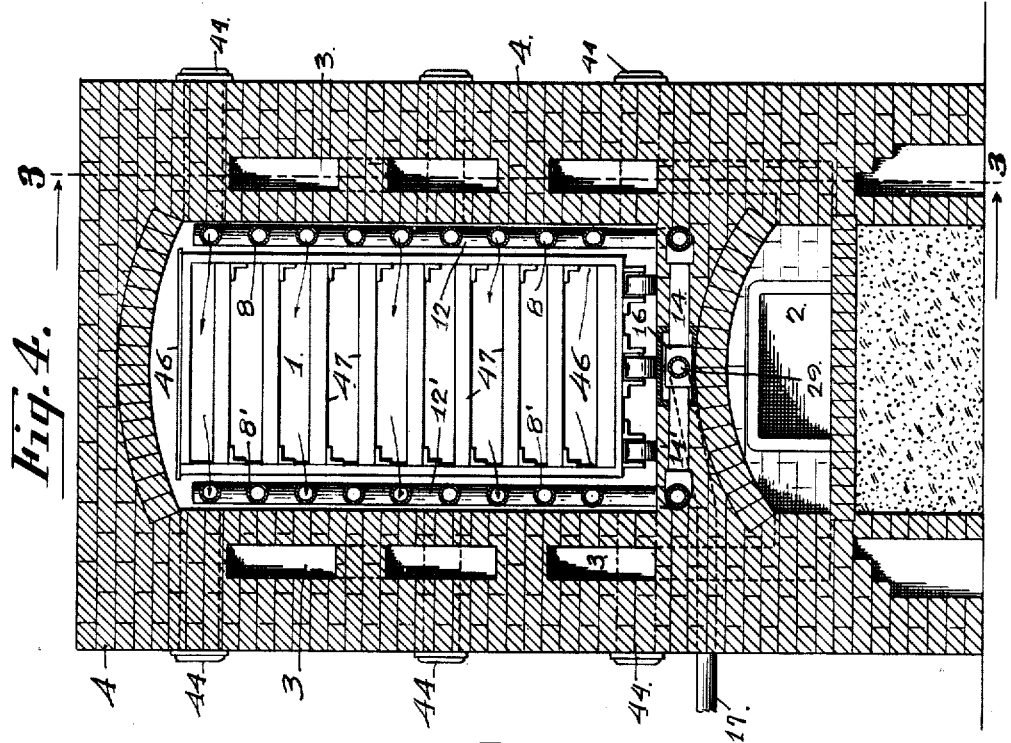
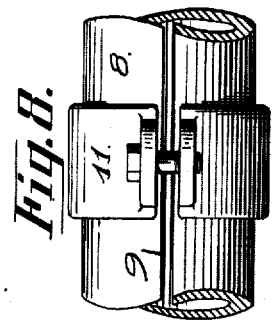
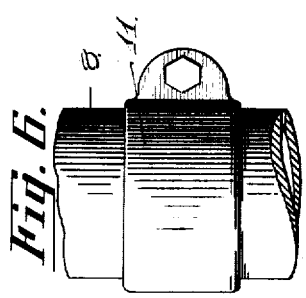
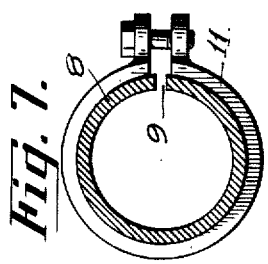
INVENTORS.
David Hill.
John A. Meroney Sr.
BY
Arthur P. S. Lee.
ATTORNEY

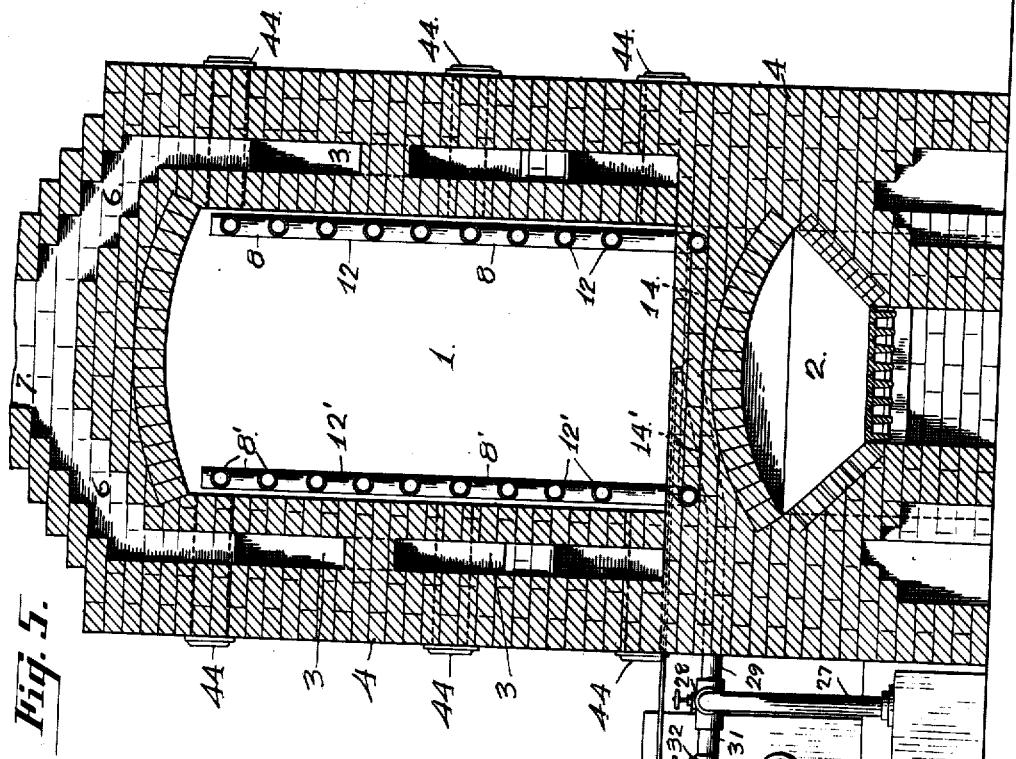

UNITED STATES PATENT OFFICE.

DAVID HILL AND JOHN A. MERONEY, SR., OF SAN FRANCISCO, CALIFORNIA, ASSIGNORS TO FRANK E. TISCORNIA, OF SAN FRANCISCO, CALIFORNIA.

DRIER AND EVAPORATOR.

1,296,519.   Specification of Letters Patent.   Patented Mar. 4, 1919.

Application filed October 8, 1917. Serial No. 196,342.

*To all whom it may concern:*

Be it known that we, DAVID HILL and JOHN A. MERONEY, Sr., citizens of the United States, residing in the city and county of San Francisco and State of California, have jointly invented new and useful Improvements in Driers and Evaporators, of which the following is a specification.

Our invention relates to improvements in driers and evaporators for fruits and similar produce wherein air currents operate in conjunction with a heated oven to remove moisture from and to sulfurate fruits, produce and the like; and the objects of our inventions are—

First, to provide an improved drier and evaporator adapted to remove moisture from and to evaporate a maximum quantity of produce within a minimum period.

Second, to provide an improved drier and evaporator adapted to diffuse separate streams of air between layers of produce or fruit to remove the moisture therefrom and to subject or expose said fruit to the action of sulfur fumes simultaneously;

Third, to provide improved means for removing the air from the oven after said air has passed over a comparatively small portion of the fruit instead of passing the moisture laden air over other fruit in the oven;

Fourth, to provide improved means for automatically reversing the air currents in the oven at regular intervals whereby all portions of the fruit will be equally subjected or exposed to the drying air currents;

Fifth, to provide mens for removing the moisture from the air before returning the same to the oven; and Sixth, to provide means for regulating and controlling the density of the air currents.

Seventh, to provide improved means for disconnecting the sulfurating device from the drier.

We accomplish these several objects by means of the improved device disclosed in the drawings forming a part of the present specification wherein like characters of reference are used to designate similar parts throughout the said specification and drawings, and in which—

Fig. 2 is a horizontal sectional view taken on line 2—2 of Fig. 1;

Fig. 3 is a longitudinal sectional view taken on line 3—3 of Fig. 4 in the direction indicated;

Fig. 4 is a transverse sectional view taken on line 4—4 of Fig. 1 in the direction indicated;

Fig. 5 is a transverse sectional view taken on line 5—5 of Fig. 1 in the direction indicated;

Figs. 6, 7 and 8 are enlarged broken detailed views of the means for regulating the density of air currents; and Figs. 9 and 10 are enlarged sectional views of the two positions of the four-way cock for reversing the direction of the air currents.

Figure 1:
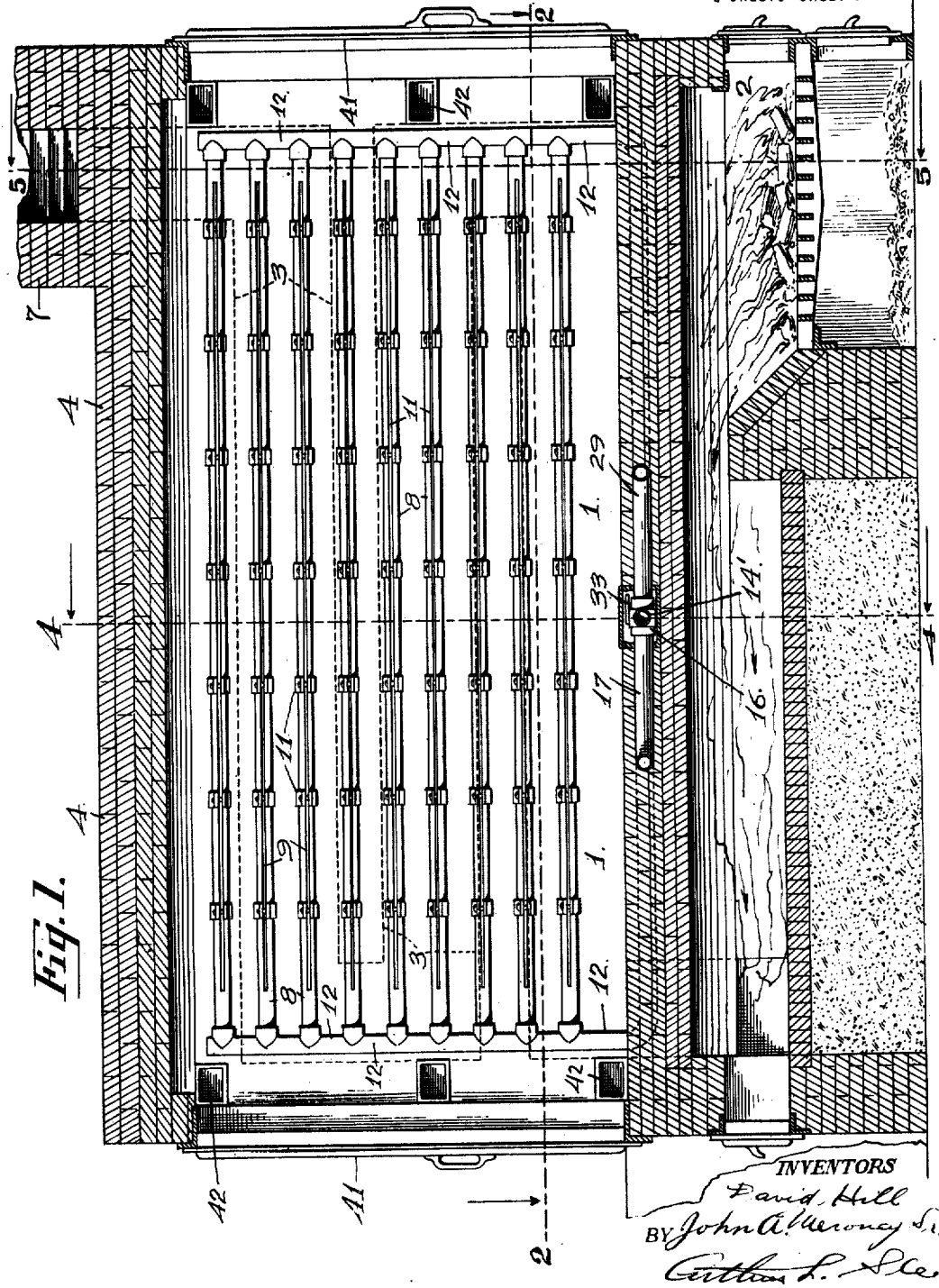
Figure 1 is a longitudinal sectional view of the drier.

Referring to the drawings the numeral 1 is used to designate in general an oven overlying a fire box or furnace 2 having communicating flues 3 which traverse the length of the drier on each side of the oven 1 and are connected at alternate ends to provide a continuous tortuous passage to carry off the products of combustion from the furnace 2 and heat the oven 1.

The flues 3 connect at the upper front portion of the drier 4 as at 6 to form a chimney 7.

An air coil is arranged at each side of the oven 1 and consists of horizontally disposed pipes 8 and 8' provided with longitudinal slots 9 and 9' and clamps 11 and 11' arranged at regular intervals throughout the length of the pipes 8 and 8' which are mounted between standards 12 and 12' connected by means of pipes 14 and 14' respectively, to a four-way cock 16 located in the approximate center of the oven floor.

The clamps 11 are provided to contract or permit the expansion of the pipes 8 to close and open the slots 9 and thereby regulate and control the velocity and density of the air streams issuing from said slots.

The detailed construction and arrangement of the clamps 11 are disclosed in enlarged detail in Figs. 6, 7 and 8 of the drawings.

A connection 17 leads from one port or outlet of the four-way cock 16 to an air purifying and drying device 18 of any suitable type, such as a box or container packed with charcoal or other moisture absorbing element.

A connection 19 leads from the air purifier 18 to a suitable blower 21 operated by a suitable motor 22. A connection 23, controlled by a valve 24, leads from the outlet of the blower 21 to a sulfurating box or device 26. From the sulfurator 26 a connection 27, controlled by a valve 28 leads to a connection or pipe 29 connected to the remaining outlet or port of the four-way cock 16.

A by-pass 31, controlled by a valve 32, is provided between the connections 23 and 27 whereby air may be returned to the oven 1 directly from the blower 21 without passing through the sulfurating device 26 by closing the valves 24 and 28 and opening the valve 32 of the by-pass 31.

The four-way cock 16 is provided with a lever or handle 33 having a rod 34 connected thereto the other end of said rod 34 being connected to a controlling device 36 of any suitable type operatively connected by means of gear 37 and pinion 38 to the shaft of the motor 22 and adapted to operate the rod 34 and four-way cock 16 at regular intervals to reverse the direction of air currents through the coils or pipes 8 the purpose of which will hereinafter be more fully described.

The oven 1 is open at both ends to receive produce or fruit to be evaporated or dried said openings being closed by means of suitable doors 41. For ventilating purposes we have provided upper and lower ventilating ducts 42 connecting the oven 1 with the outer atmosphere, said ducts being closed by suitable doors 44.

To support the produce or fruit to be dried in layers we have provided a rack 46 to support trays 47, preferably of the screen bottom type, between the pipes 8 so that a blast or stream of air from said pipes will be directed between the trays 47.

The rack 46 may be in the form of a truck as disclosed in Fig. 4 of the drawings, to facilitate loading and unloading the oven 1.

The operation is as follows:

The fruit or produce being arranged in layers within the oven by means of screen bottomed trays it is obvious that a maximum area of fruit is exposed to the streams of drying and sulfurating air which is introduced and whose direction is reversed at regular intervals in the following manner:

The air coils, consisting of the longitudinally slotted pipes 8, and the oven 1 are heated by the products of combustion which pass from the furnace or fire box 2 through the flues 3 in the walls of the drier 4.

The air passes from the blower 21, which is operated by the motor 22, through the connection or pipe 23, sulfurating device 26, pipe 27 and the pipe 29 to the four-way cock 16 which is positioned as disclosed in Fig. 10 of the drawings.

This causes the air to traverse the connection 14, standards 12 and pipes 8. The air is forced through the longitudinal slots 9, which may be regulated by the clamps 11 to contract or expand the pipes 8 to close or open the slots 9 and thereby regulate the density and velocity of the streams of warm dry air issuing therefrom.

As the trays 47 and layers of produce therein are arranged between the pipes 8 it is evident that the separate air streams from the slots 9 of the pipes 8 will be directed between the layers of produce thereby exposing both the top and bottom of adjacent layers to separate streams of warm dry air from the pipes.

As the four-way cock 16 is positioned to connect the intake of the blower with the coils or pipes 8' the air directly after having passed between the layers of produce is removed from the furnace through the slots 9' of the pipes 8' and carried, by means of the standards 12' connection 14' and pipe 17 into the charcoal drier and purifier 18 where it is dried and then passes through the pipe 19 to the blower 21 by means of which blower 21 the dried and purified air is returned through the sulfurator 26 to the oven 1 through the pipes 8.

In this manner the air is evenly and constantly diffused by passing through the oven 1 from one side to the other removing a portion of the moisture from the exposed layers of produce in its passage to the coils 8'.

It is evident that those sides of the layers adjacent to the pipes 8 will be exposed to a warm dry air while the side of the layers adjacent to the pipes 8' will be exposed to air that has absorbed some moisture so that the sides of the layers adjacent to the pipes 8 may be dried more rapidly and thoroughly than the opposite sides of the layers adjacent to the outlet of the air.

To more evenly expose both sides of the layers to the same amount of dry warm air the lever or arm 33 of the four-way cock 16 is operated at regular intervals by means of the reversing mechanism 36.

After a period then, the four-way cock will automatically be shifted as disclosed in Fig. 9 of the drawings, to carry the warm dry air from the blower 23, through the pipe 29 to the connection 14', standards 12' and pipes 8' and slots 9' therein by means of said reversing mechanism 36.

The air will then be removed from the oven 1 through the pipes 8, standards 12 and connections 14 to the four-way cock 16 and pipe 17 which leads to the intake of the blower 21.

The sulfurator may be disconnected from the system by closing the valves 24 and 28 and opening the valve 32 in the by-pass 31.

The air will then pass directly from the blower 21 to the oven 1 without passing through the sulfurator.

As the reversing mechanism may be of any suitable type and as the details thereof could form no part of the present invention said details have been purposely omitted from the drawings.

It is evident from the foregoing that we have provided an improved drier and evaporator adapted to evenly and constantly diffuse separate streams of air from one side of an oven to the other thereby greatly facilitating the process of drying and evaporating fruit, produce and the like and also improved means for automatically reversing the direction of the air currents at regular intervals to more evenly expose the produce to the action of the moisture removing air streams.

The details of construction are so susceptible to variation that we do not wish to confine ourselves to the precise construction shown herein but rather to avail ourselves of any modification that may fall properly within the scope of our invention.

Having thus described our invention what we claim as new and desire to secure by Letters Patent is—

1. A drier and evaporator comprising a heated oven to receive perishable produce; means for sustaining the produce in layers; means for directing separate streams of warm dry air from one side of the oven to the other and between the layers of produce; means for removing the air from the oven directly it has passed over the produce, drying and returning the air to the oven; and means for reversing the direction of the air streams; and means for sulfurating the air before returning same to the oven.

2. A drier comprising a heated oven to receive produce to be dried and evaporated; means for delivering separate streams of warm, dry air directly across the oven; means for removing the air from the oven, drying and returning said air to the oven through the delivering means; and means for sulfurating the air before returning same to the oven.

3. A drier and evaporator comprising a heated oven to receive produce to be dried and evaporated; a pair of coils arranged on each side of the oven, each coil consisting of a group of apertured pipes; means for adjusting the apertures; a four-way cock connected to both coils; a blower having an intake and an exhaust connected to the four-way cock whereby air may be delivered to and removed from the oven; and means for operating the four-way cock at regular intervals to reverse the direction of air pressure through the coils.

4. A drier and evaporator comprising a heated oven to receive produce to be dried and evaporated; a pair of apertured coils arranged one on each side of the oven; a four-way cock connected to each coil; a blower having an exhaust and intake connected to the four-way cock to deliver and remove air to and from the oven through the coils; means for operating the four-way cock at regular intervals to reverse the direction of air through the coils; and means for sulfurating the air before same is returned to the oven.

5. A drier and evaporator comprising an oven to receive produce; means for sustaining produce in layers in the approximate center of the oven; a pair of apertured coils arranged one on each side of the oven to deliver separate streams of air between the layers of produce; and means for delivering air alternately through opposite coils to remove the moisture from the produce; and means for sulfurating the air before delivering same to the oven.

6. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils.

7. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils; and means for sulfurating the air before delivery to the oven.

8. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils; and means for drying the air when removed from the oven.

9. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils; and means for drying the air when removed from the oven; and means for sulfurating the air before delivery to the oven.

10. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils; and means for drying the air when removed from the oven; and means for sulfurating the air before delivery to the oven; and ventilating ducts to ventilate the oven.

11. A drier and evaporator comprising an oven to receive produce; means for heating the oven; means for sustaining layers of produce within the oven; a pair of apertured coils arranged one on each side of the oven to deliver separate streams of air between the layers of produce; a four-way cock connected to the coils; a blower connected to the four-way cock to deliver air to the oven through one coil and remove air from the oven through the other coil; and means for operating the four-way cock at regular intervals to reverse the direction of air through the coils; and means for drying the air when removed from the oven; and means for sulfurating the air before delivery to the oven, and ventilating the ducts arranged at the upper and lower portions of the oven to ventilate the same.

12. A drier and evaporator comprising a heated oven to receive produce to be dried and evaporated; means for sustaining the produce in layers; a coil, consisting of longitudinally slotted pipes arranged on each side of the oven to deliver air currents between the layers of produce; means for regulating the slots within the pipes; means for delivering warm dry air to the oven through one coil and removing said air from said oven directly after it has passed between the layers of produce, warming and drying said air and returning said air to the oven; and means for automatically reversing the direction of air through the coils at regular intervals.

13. A drier and evaporator comprising a heated oven to receive produce; means for sustaining layers of produce within the oven to expose both surfaces of said layers; a coil on each side of the oven arranged to deliver separate air currents between the layers of produce, said coils consisting of longitudinally slotted pipes; suitable clamps secured to the pipes of the coils at regular intervals to regulate the width of the longitudinal slots therein; means for delivering warm dry air to the oven through one set of coils and for removing the said air from said oven through the other set of coils directly after it has passed between the layers of produce and for warming, drying and returning said air to the oven through the coils; and means for automatically reversing the direction of the air currents through the coils at regular intervals.

In witness whereof we hereunto set our signatures.

DAVID HILL.
JOHN A. MERONEY, Sr.